(12) United States Patent
Singh

(10) Patent No.: US 9,159,085 B2
(45) Date of Patent: *Oct. 13, 2015

(54) APPLICATION PERFORMANCE IMPROVEMENTS IN RADIO NETWORKS

(71) Applicant: Nokia Siemens Networks Oy, Espoo (FI)

(72) Inventor: Ajoy K. Singh, Round Lake, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,237

(22) Filed: Nov. 6, 2014

(65) Prior Publication Data

US 2015/0066647 A1    Mar. 5, 2015

Related U.S. Application Data

(63) Continuation of application No. 13/228,544, filed on Sep. 9, 2011, now Pat. No. 8,913,997.

(51) Int. Cl.
*H04M 3/42* (2006.01)
*G06Q 30/02* (2012.01)
(Continued)

(52) U.S. Cl.
CPC .......... *G06Q 30/0257* (2013.01); *G06F 3/0481* (2013.01); *G06F 3/04842* (2013.01);
(Continued)

(58) Field of Classification Search
CPC ........... H04L 12/1475; H04L 12/1492; H04L 41/0896; H04L 43/08; H04L 65/1083; H04L 65/80; H04W 4/02; H04W 4/028
USPC ........... 455/414.1, 405, 446, 14.12, 419, 420, 455/422.1, 436, 456.3; 370/230.1–238, 204
See application file for complete search history.

(56) References Cited

U.S. PATENT DOCUMENTS

| 7,272,128 B2 | 9/2007 | Harris et al. ................... 370/338 |
| 7,496,366 B2 | 2/2009 | Harris ......................... 455/452.2 |

(Continued)

FOREIGN PATENT DOCUMENTS

| EP | 1622315 A1 | 2/2006 |
| WO | WO-01/50278 A1 | 7/2001 |

(Continued)

OTHER PUBLICATIONS

"Transcoding Internet and Mobile Video: Solutons for the Long Tail", Greg Ireland et al., IDC Sep. 2007, 15 pgs.

(Continued)

*Primary Examiner* — Babar Sarwar
(74) *Attorney, Agent, or Firm* — Harrington & Smith

(57) ABSTRACT

A method includes sending a request to a user indicating options to modify a quality of experience for one or more application flows between a radio network and a mobile node used by the user. The request indicates the user should select one of the following: declining an option to upgrade an existing service to a new service able to support the one or more application flows with a higher quality of experience than supported by the existing service; or accepting an option to upgrade the existing service to the new service. In response to receiving an indication the user selected the option to upgrade the existing service, performing one or more actions to upgrade the existing service to the new service. The option to upgrade the existing service can include an option of receiving advertisements for the new service or paying extra for the new service.

18 Claims, 12 Drawing Sheets

(51) Int. Cl.

| | | |
|---|---|---|
| H04L 12/24 | (2006.01) | |
| H04L 29/06 | (2006.01) | |
| G06F 3/0481 | (2013.01) | |
| G06F 3/0484 | (2013.01) | |
| H04W 28/02 | (2009.01) | |
| H04W 28/24 | (2009.01) | |
| H04L 12/26 | (2006.01) | |
| H04L 12/14 | (2006.01) | |
| H04W 84/04 | (2009.01) | |

(52) U.S. Cl.
CPC ........ *G06Q30/0273* (2013.01); *H04L 12/1492* (2013.01); *H04L 41/0896* (2013.01); *H04L 65/1083* (2013.01); *H04L 65/80* (2013.01); *H04W 28/0268* (2013.01); *H04W 28/24* (2013.01); *H04L 12/1475* (2013.01); *H04L 43/08* (2013.01); *H04W 84/042* (2013.01)

(56) References Cited

U.S. PATENT DOCUMENTS

| | | | |
|---|---|---|---|
| 7,970,648 B2 | 6/2011 | Gailey et al. | 705/14.49 |
| 7,971,228 B2 | 6/2011 | Rosenberg et al. | 726/1 |
| 2006/0025151 A1* | 2/2006 | Karaoguz et al. | 455/455 |
| 2008/0026756 A1 | 1/2008 | Harris et al. | 455/436 |
| 2008/0095173 A1 | 4/2008 | Bugenhagen | 370/395.21 |
| 2008/0162694 A1 | 7/2008 | Mamaghani et al. | 709/224 |
| 2010/0316015 A1 | 12/2010 | Kim et al. | 370/329 |
| 2011/0075557 A1 | 3/2011 | Chowdhury et al. | 370/230 |
| 2013/0073454 A1* | 3/2013 | Busch | 705/39 |

FOREIGN PATENT DOCUMENTS

| | | |
|---|---|---|
| WO | WO-2005/122475 A1 | 12/2005 |
| WO | WO-2009/139676 A1 | 11/2009 |

OTHER PUBLICATIONS

"Stoke Mobile Data Offload Solution Brief", Aug. 2009, 4 pgs.
"Internet Printing Protocol (IPP): Job Progress Attributes", T. Hasting et al., RFC 3381, Sep. 2002, 17 pgs.
"Performance Enhancing Proxies Intended to Mitigate Link-Related Degradations", Border, et al., RFC 3135, Jun. 2001, 45 pgs.
Cisco Systems; "Event Based Charging", 3GPP Draft, S2-062218; 3GPP TSG SA WG2 Architecture—S2#53; Jun. 26-30, 2006, Portugal; whole document (2 pages); 3rd Generation Partnership Project (3GPP), Mobile Competence Centre, 650; Route des Lucicies; F-06921 Sophia-Antipolis Cedex; France.

* cited by examiner

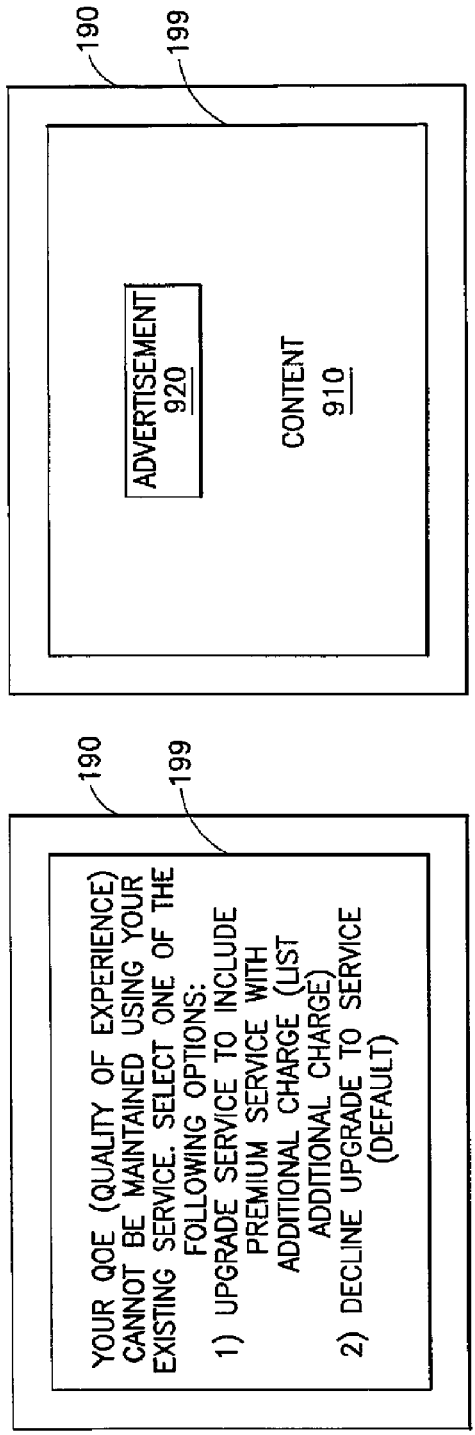
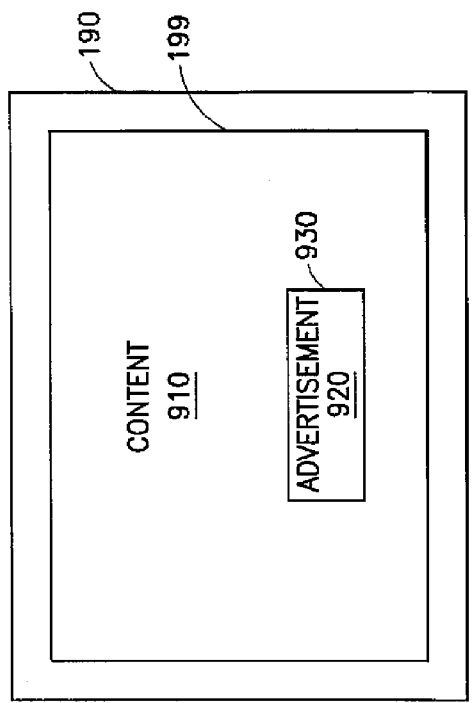
FIG.9A
FIG.9B
FIG.8C

APPLICATION PERFORMANCE IMPROVEMENTS IN RADIO NETWORKS

CROSS REFERENCE TO RELATED APPLICATIONS

This patent application is a continuation of U.S. patent Ser. No. 13/228,544, filed on Sep. 9, 2011, the disclosure of which is incorporated by reference herein in its entirety.

TECHNICAL FIELD

This invention relates generally to wireless networks and, more specifically, relates to techniques for improving application performance between a radio network and a wireless node.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Radio networks make radio resource management (RRM) decisions based on radio link conditions, load, buffer size, and the like. Handover decisions are made based on radio link conditions, load, operator policies, and additional data. Scheduling decisions are made based on radio link conditions, buffer size and various other radio parameters.

However, radio networks do not take into account real time application feedback in RRM decision making, handover decisions, or scheduling decisions. Therefore, if a user using a particular application experiences degradation in performance, the radio network may not be able to return performance of the application to a suitable level or to increase performance of the application.

A technique called deep packet inspection (DPI) is being used to examine interne protocol (IP) packets in a network such as a wireless access network. This technique is called "deep" packet inspection because the data portion of an IP packet can be examined in addition to examination of multiple headers in the IP packet.

Radio networks support prepaid and post-paid billing based on volume, time, application usage, and other information. DPI techniques can be used to identify application type for billing purposes. However, there is no current technique for using DPI to evaluate application performance and using real time application performance to trigger billing optimization. Nonetheless, DPI may be used for other scenarios, as described below.

The third generation partnership project (3GPP) is defining offloading solutions that would enable offloading of Internet protocol (IP) flows based on following criteria:
1) Local IP access (LIPA);
2) Selective IP traffic offload (SIPTO); and
3) Traffic offload functions.

These offload solutions can either use APN (access point name) or DPI (deep packet inspection) or ACL (access control list) rules. However, existing solutions do not take into account real time application feedback in IP offload decision making.

SUMMARY

The embodiments set forth in this section are exemplary.

In an exemplary embodiment, a method is disclosed that includes sending a request to a user indicating options to modify a quality of experience for one or more application flows between a radio network and a mobile node used by the user. The request indicates the user should select one of the following: declining an option to upgrade an existing service to a new service able to support the one or more application flows with a higher quality of experience than supported by the existing service; or accepting an option to upgrade the existing service to the new service able to support the one or more application flows with a higher quality of experience than supported by the existing service. The method also includes, in response to receiving an indication the user selected the option to upgrade the existing service, performing one or more actions to upgrade the existing service to the new service.

In a further exemplary embodiment, a computer program product is disclosed that includes a computer-readable memory bearing computer program code embodied therein for use with a computer. The computer program code comprises code for sending a request to a user indicating options to modify a quality of experience for one or more application flows between a radio network and a mobile node used by the user. The request indicates the user should select one of the following: declining an option to upgrade an existing service to a new service able to support the one or more application flows with a higher quality of experience than supported by the existing service; or accepting an option to upgrade the existing service to the new service able to support the one or more application flows with a higher quality of experience than supported by the existing service. The computer program code also comprises code for, in response to receiving an indication the user selected the option to upgrade the existing service, performing one or more actions to upgrade the existing service to the new service.

In an additional exemplary embodiment, an apparatus includes one or more processors and one or more memories including computer program code. The one or more memories and the computer program code configured to, with the one or more processors, cause the apparatus to perform at least the following: sending a request to a user indicating options to modify a quality of experience for one or more application flows between a radio network and a mobile node used by the user, the request indicating the user should select one of the following: declining an option to upgrade an existing service to a new service able to support the one or more application flows with a higher quality of experience than supported by the existing service; or accepting an option to upgrade the existing service to the new service able to support the one or more application flows with a higher quality of experience than supported by the existing service; in response to receiving an indication the user selected the option to upgrade the existing service, performing one or more actions to upgrade the existing service to the new service.

In an additional exemplary embodiment, an apparatus includes at least the following: means for sending a request to a user indicating options to modify a quality of experience for one or more application flows between a radio network and a mobile node used by the user, the request indicating the user should select one of the following: declining an option to upgrade an existing service to a new service able to support the one or more application flows with a higher quality of experience than supported by the existing service; or accepting an option to upgrade the existing service to the new service able to support the one or more application flows with a higher quality of experience than supported by the existing service; means, in response to receiving an indication the user selected the option to upgrade the existing service, for performing one or more actions to upgrade the existing service to the new service.

In another exemplary embodiment, a method includes receiving from a radio network a request corresponding to one or more application flows between the radio network and a mobile node. The received request indicates a user of the mobile node should select one of the following: declining an option to upgrade the existing service to a new service able to support the one or more application flows with a higher quality of experience than supported by the existing service; or accepting an option to upgrade the existing service to a new service able to support the one or more application flows with a higher quality of experience than supported by the existing service. The method includes displaying on a display of the mobile node a message suitable to allow the user to select one of the options; allowing the user to select one of the options; and in response to the user selecting the option to upgrade the existing service, sending from the mobile node to the radio network an indication the user selected the option to upgrade the existing service.

In an additional exemplary embodiment, a computer program product includes a computer-readable memory bearing computer program code embodied therein for use with a computer. The computer program code includes code for receiving from a radio network a request corresponding to one or more application flows between the radio network and a mobile node. The received request indicates a user of the mobile node should select one of the following: declining an option to upgrade the existing service to a new service able to support the one or more application flows with a higher quality of experience than supported by the existing service; or accepting an option to upgrade the existing service to a new service able to support the one or more application flows with a higher quality of experience than supported by the existing service. The computer program code includes code for displaying on a display of the mobile node a message suitable to allow the user to select one of the options; code for allowing the user to select one of the options; and code for, in response to the user selecting the option to upgrade the existing service, sending from the mobile node to the radio network an indication the user selected the option to upgrade the existing service.

In a further exemplary embodiment, an apparatus includes one or more processors and one or more memories including computer program code. The one or more memories and the computer program code are configured to, with the one or more processors, cause the apparatus to perform at least the following: receiving from a radio network a request corresponding to one or more application flows between the radio network and a apparatus, the received request indicating a user of the apparatus should select one of the following: declining an option to upgrade the existing service to a new service able to support the one or more application flows with a higher quality of experience than supported by the existing service; or accepting an option to upgrade the existing service to a new service able to support the one or more application flows with a higher quality of experience than supported by the existing service; displaying on a display of the apparatus a message suitable to allow the user to select one of the options; allowing the user to select one of the options; and in response to the user selecting the option to upgrade the existing service, sending from the apparatus to the radio network an indication the user selected the option to upgrade the existing service.

In a further exemplary embodiment, an apparatus includes at least the following: means for receiving from a radio network a request corresponding to one or more application flows between the radio network and a apparatus, the received request indicating a user of the apparatus should select one of the following: declining an option to upgrade the existing service to a new service able to support the one or more application flows with a higher quality of experience than supported by the existing service; or accepting an option to upgrade the existing service to a new service able to support the one or more application flows with a higher quality of experience than supported by the existing service; means for displaying on a display of the apparatus a message suitable to allow the user to select one of the options; means for allowing the user to select one of the options; and means, in response to the user selecting the option to upgrade the existing service, for sending from the apparatus to the radio network an indication the user selected the option to upgrade the existing service.

BRIEF DESCRIPTION OF THE DRAWINGS

In the attached Drawing Figures:

FIGS. 8A, 8B, and 8C illustrate different displayed representations of requests for a user to select an option from a number of options.

FIGS. 9A and 9B show two exemplary techniques for displaying to a user an advertisement received in an application flow and how that advertisement might be added to the application flow.

DETAILED DESCRIPTION OF THE DRAWINGS

As stated above, DPI can be used to support a number of techniques. However, the current techniques do not support triggering of differentiated (e.g., advertisement-based) service delivery based on real-time performance of an application, where real-time application performance can be determined by evaluating the metadata obtained from deep packet inspection of multiple application packets associated with a mobile node. Further, current techniques do not support a billing mechanism where a user can be provided value-added services (e.g., beam-forming) for allowing an operator to push advertisement content to the user or to charge a premium in order for the user to receive application content.

The instant disclosure provides techniques for implementing these and other improvements. In particular, this disclosure proposes techniques to trigger differentiated billing based on deep packet inspection of multiple packets from an IP data flow of an application, where DPI of multiple packets is performed to obtain metadata associated with a data flow. In an exemplary embodiment, metadata is used to identify the real-time performance of the active application. Metadata along with user policy may be used to decide one or more of the following optimizations in an exemplary embodiment:

When to trigger the mobile node to switch to a premium service (e.g., by upgrading the service of the user) to achieve better performance; or When to trigger the mobile node to switch to an advertising-based, value-added service delivery.

Furthermore, the premium service and value-added service delivery in an exemplary embodiment are brought about by increasing service to the user and a corresponding increase in throughput to the mobile node. In order to cause the increased throughput to the mobile node, this disclosure proposes techniques to optimize RRM functionality based on real-time application feedback. That is, deep packet inspection and associated metadata may be used to trigger RRM (e.g., scheduling, handover, and the like) decisions. DPI can be implemented on NodeB (a base station), IP offload gateway (IOG) or any other access network element(s). In the examples shown below, the IOG is shown separate from the NodeB (also written as NB), but this is merely exemplary.

This disclosure also proposes other techniques for increasing throughput to a mobile node. Techniques for optimizing offloading functionality are proposed herein based on real-time application feedback. These techniques may use metadata derived from DPI along with L1 feedback.

Figure 1:
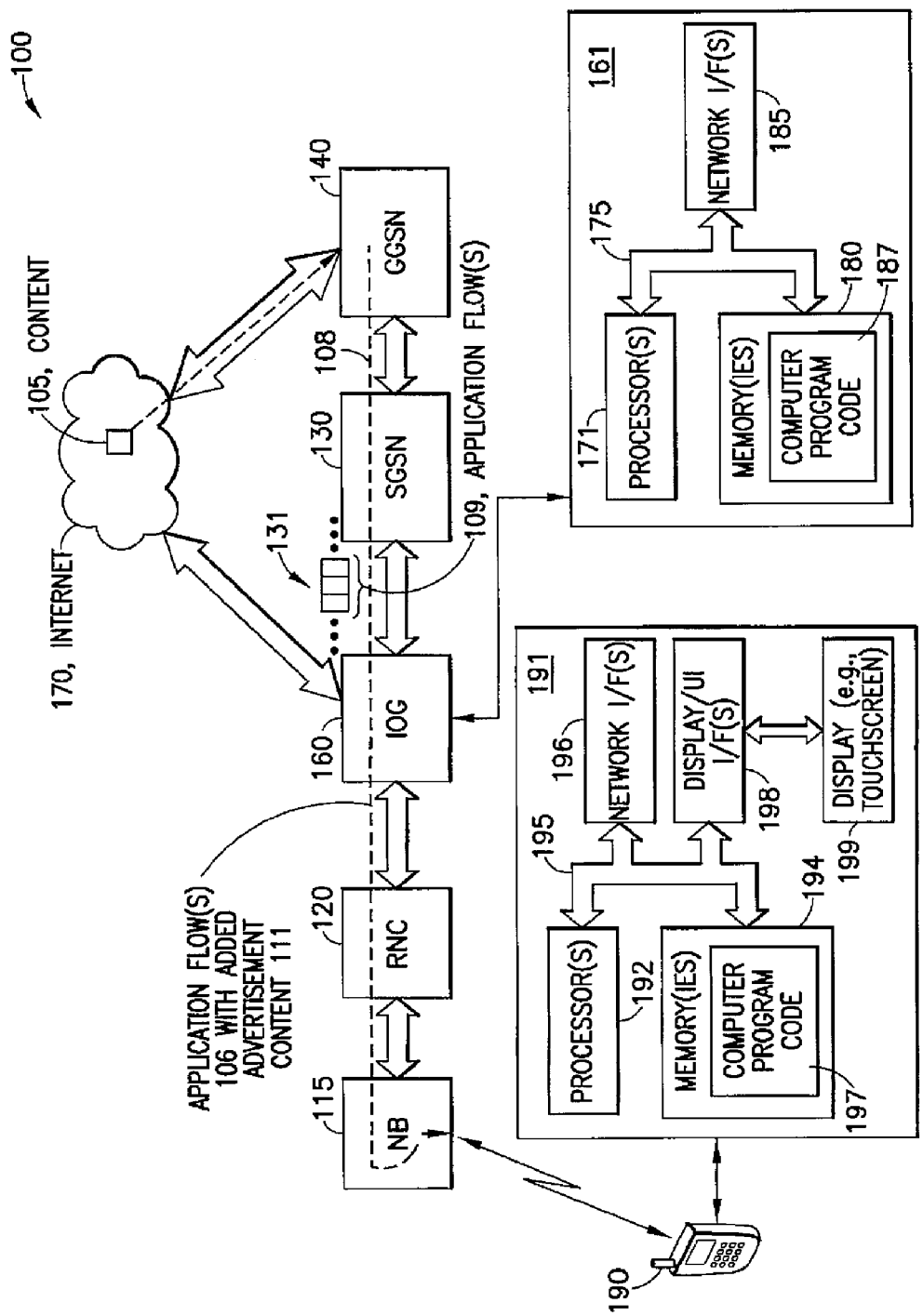
FIG. 1 illustrates a simplified block diagram of a system into which exemplary embodiments of this invention may be practiced.

An exemplary system into which exemplary embodiments of this invention may be practiced is shown in FIG. 1. The system includes a network 170 such as the Internet, a general packet radio service gateway serving node (GGSN) 140, a serving GPRS (general packet radio service) support node (SGSN) 130, an IP (Internet protocol) offload gateway (IOG) 160, a radio network controller (RNC) 120, an NB (UTRAN Node B, where UTRAN is universal terrestrial radio access network) 115, and a mobile node 190. The Node B 115 is a wireless access point providing access by the mobile node 190 to the packet-based radio network 100 (comprising the Node B 115, the RNC 120, the IOG 160, the SGSN 130, and the GGSN 140). A core network part of the radio network 100 includes in an example the SGSN 130 and the GGSN 140. However, operators can also have additional routers and transport network between GGSN and Internet point of presence.

The IOG 160 comprises a computer 161 comprising one or more processors 171, one or more memories 180, and one or more wired or wireless network interfaces 185, interconnected through one or more buses 175. The one or more memories 180 include computer program code 187, which when executed by the one or more processors 171 causes the computer 161/IOG 160 to perform one or more of the operations described herein. The mobile node 190 comprises a computer 191 comprising one or more processors 192, one or more memories 194, one or more wired or wireless network interfaces 196, and one or more display/user interface (UI) inferences 198 interconnected through one or more buses 195. The computer 191 also includes a display 199 such as a touch screen and may include a keyboard or other input device. The one or more memories 194 include computer program code 197, which when executed by the one or more processors 192 causes the computer 191/mobile node 190 to perform one or more of the operations described herein. IOG can also be implemented on ATCA (Advanced Telecommunications Computing Architecture) compliant embedded board. Standards bodies such as Industrial Computer Manufacturers Group (PICMG) consortium are working on ATCA standardization. The packet-based radio network 100 is packet-based because the radio network 100 is able to handle packet-based traffic (as illustrated by packets 131). The radio network 100 may not be limited to packet-based traffic and may handle other traffic, such as circuit-switched traffic.

In general, the various embodiments of the mobile node 190 can include, but are not limited to, cellular telephones, smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable memories 180/194 may be of any type suitable to the local technical environment and may be implemented using any suitable data storage technology, such as semiconductor based memory devices, flash memory, magnetic memory devices and systems, optical memory devices and systems, fixed memory and removable memory. The processors 171/192 may be of any type suitable to the local technical environment, and may include one or more of general purpose computers, special purpose computers, microprocessors, digital signal processors (DSPs) and processors based on a multi-core processor architecture, as non-limiting examples.

The mobile node 190 accesses the content 105 in the Internet 170 during a session. For instance, the content 105 could be a video of a television show or a movie. The radio network 100 (e.g., the GGSN 140 and the SGSN 130) creates a stream 108 comprising one or more application flows 109 using the content 105 and other content (not shown) for other mobile nodes or other applications of a mobile node. The Internet 170 in this example is a network that terminates application flow(s) 109 corresponding to the content 105. As part of the session, the radio network 100 forwards the stream 108 to the associated mobile node 190, and the Node B 115 wirelessly communicates the media stream 108 to the associated mobile node 190. The media stream 108 includes packets 131. As part of the media stream 108, there are one or more application flows 109 (comprising three of the packets 131 in this example) that enter the IOG 160. Typically, one of the application flows 109 corresponds to the content 105, although multiple application flows 109 might correspond to the content. The IOG 160 then can create one or more application flows 106 having added advertisement content 111. As described in more detail below, when the application flow 109 meets certain criteria and based on user input, the IOG 160 can add added advertising content 111 to the application flow 109 corresponding to the content to create the application flow 106 with the added advertising content 111. In the example of FIG. 1, the application flows 109 and 106 may correspond to multiple applications. Other facets of FIG. 1 are described in more detail below.

Figure 2:
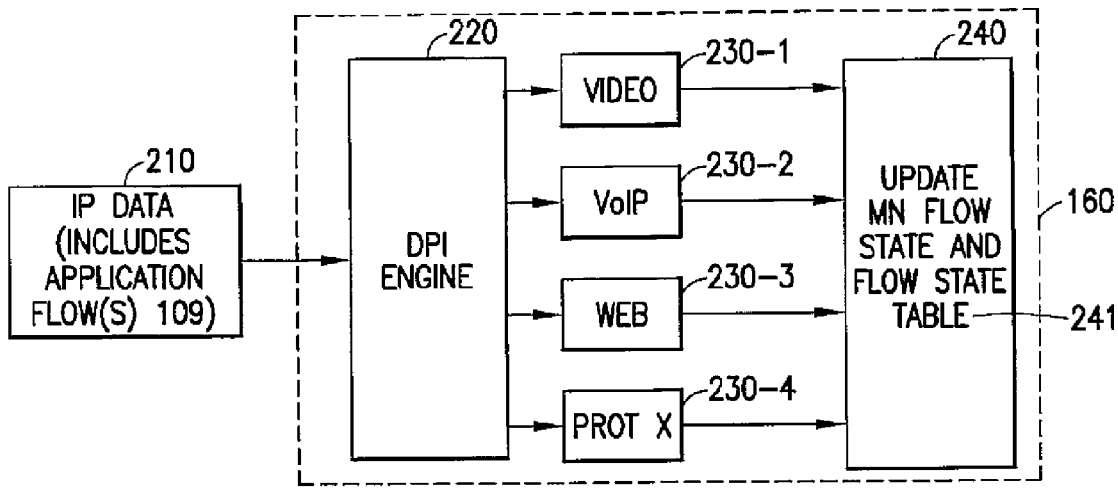
FIG. 2 illustrates a simplified block diagram of deep packet inspection elements implemented in an exemplary embodiment in the IP (Internet protocol) offload gateway (IOG) of FIG. 1.

Turning to FIG. 2, this figure illustrates a simplified block diagram of deep packet inspection (DPI) elements implemented in an exemplary embodiment in the IOG 160. The IP data 210 includes the application flow(s) 109 of the stream 108. The DPI module 220 analyzes the IP data 210 and therefore can determine which protocols 230 are used for video 230-1, voice over IP (VoIP) 230-2, Web (e.g., hypertext markup language, HTML) 230-3, and any other suitable protocol 230-4 (Prot X, to indicate another protocol) and can decipher the streams being communicated using the protocols. The DPI 220 then performs the action in block 240 of updating the MN (mobile node) flow state to create/modify MN flow state and corresponding flow state table 241. For instance, in the case of a stream 108 having an application flow 109 using the video protocol 230-1, the MN flow state 241 could indicate that a video is being communicated via the application flow 109. The DPI engine will monitor application flows 109 between the mobile node 190 and correspondent nodes in the radio network 100 and extract metadata associated with individual application flows over a number of packets for the flows. For example, metadata information can contain a mean opinion score (MOS) of audio and video application flows. The following are additional examples of DPI metadata: application response time (such as round trip time, RTT), latency, throughput, video quality metrics, jitter, packet loss, and the like.

Figure 3:
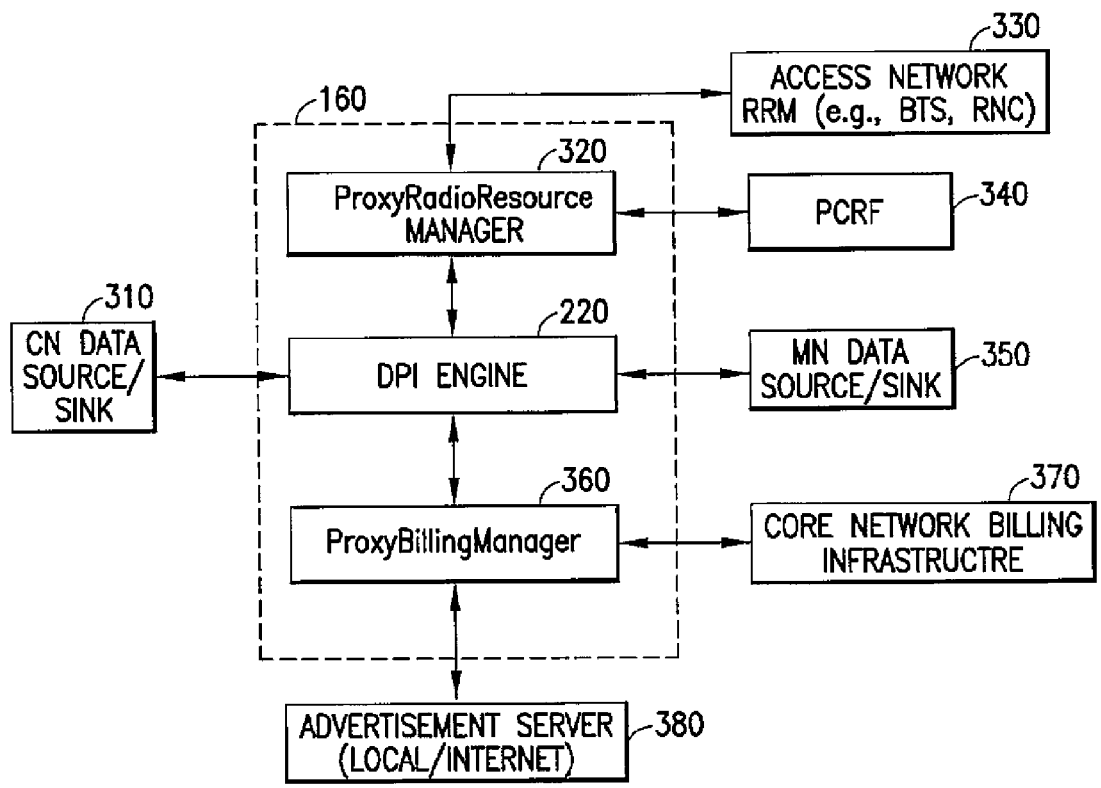
FIG. 3 illustrates a simplified block diagram of IOG interaction with radio network and mobile node (MN) elements in an exemplary embodiment.

Turning to FIG. 3, this figure illustrates a simplified block diagram of IOG interaction with radio network and mobile node (MN) elements in an exemplary embodiment. The IOG 160 in this example includes a proxy radio resource (ProxyRadioResource) manager 320, the DPI engine 220, and a proxy billing manager (ProxyBillingManager) 360. The IOG 160 also interacts with the access network radio resource management (RRM) 330, such as a base transceiver station (BTS) or radio network controller (RNC) and a policy and charging rules function (PCRF) 340 via, e.g., the proxy radio resource manager 320. The IOG 160 also interacts with a core network billing infrastructure 370 and an advertisement server 380 via, e.g., the proxy billing manager 360. The IOG 160 also receives and transmits application flows to the core network (CN) data source/sink 310 and to the MN data source/sink 350. In the example of FIG. 1, the CN data source/sink 310 includes the RNC 120 and/or the SGSN 130. The MN data source/sink 350 is, e.g., one or more applications executing on the wireless device 190.

Figure 5:
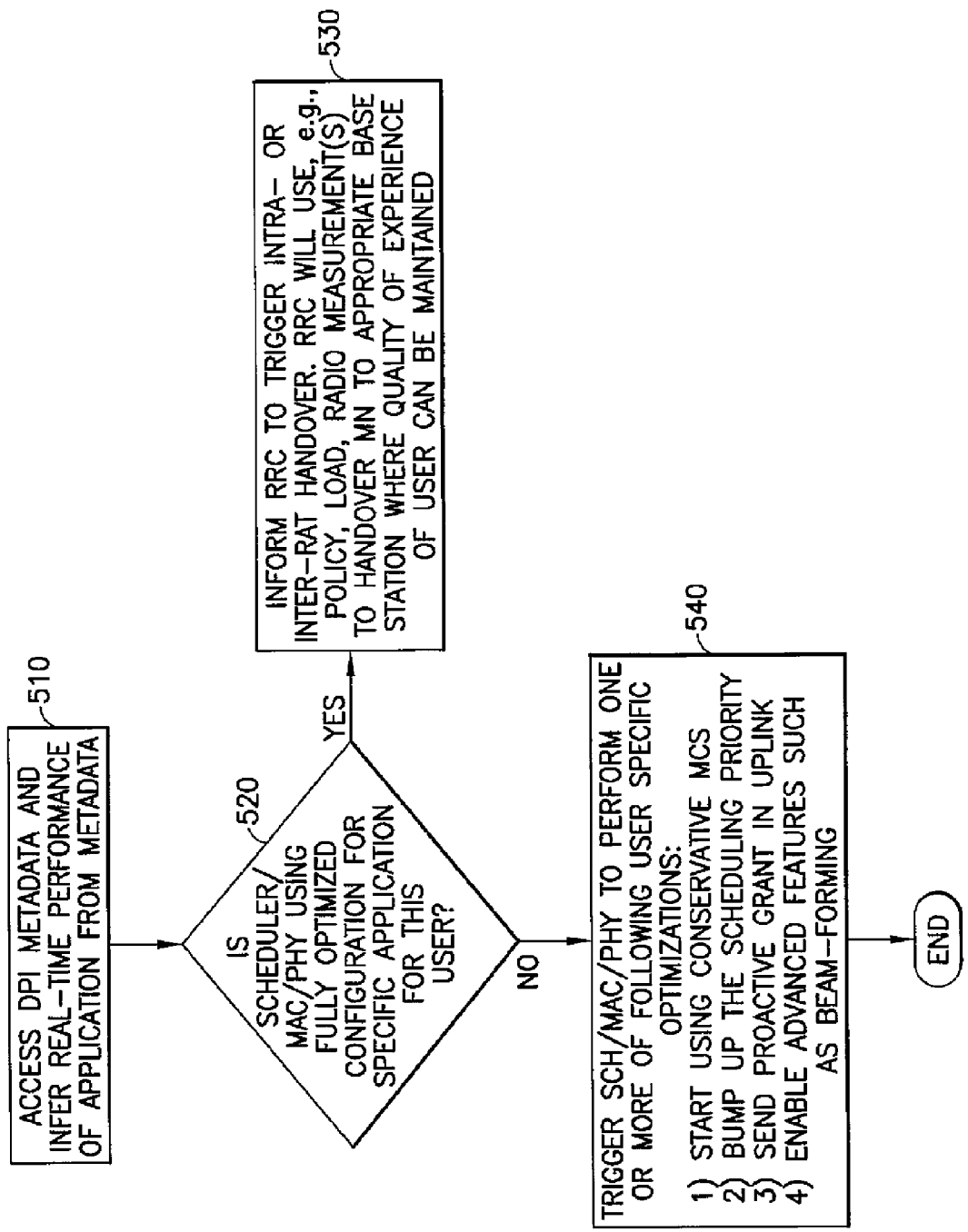
FIG. 5 illustrates a flowchart of a method to upgrade service for a user using radio resource techniques for application flows from a radio network to an MN in accordance with an exemplary embodiment of the instant invention.

In an exemplary embodiment, the proxy radio resource manager 320 performs the operations in FIG. 5. The proxy billing manager 360 performs billing related functions described in more detail below. The division into blocks 160, 220, 320, and 360 is for ease of reference and should not be considered to be limiting. The functionality described in relationship to these (and any other blocks) may be implemented by a computer system 161 and may be further subdivided or combined.

The DPI engine 220 will share metadata with the proxy radio resource manager 320 for processing and making RRM decisions. The proxy radio resource manager 320 will utilize metadata to trigger various RRM procedures such as conservative scheduling to avoid over-the-air jitter and delay, handover procedures, and the like, as explained in more detail below. The proxy radio resource manager 320 will also interact with the proxy billing manager 360, e.g., to enhance a quality of service (QoS) parameter associated with a user.

Figure 4:
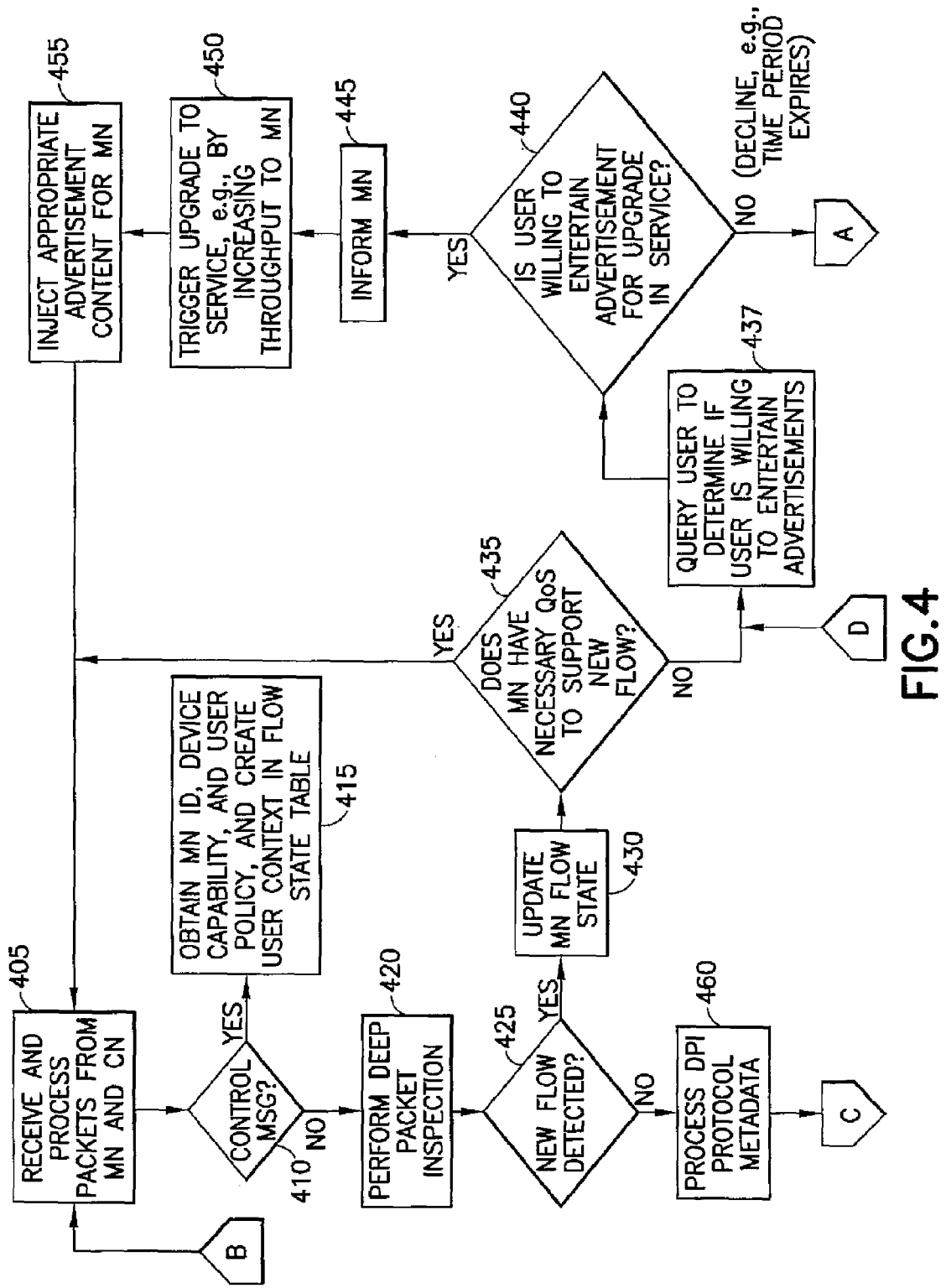
FIG. 4 illustrates a flowchart of a method for application performance improvements in radio networks in accordance with an exemplary embodiment of the instant invention.
Figure 4:
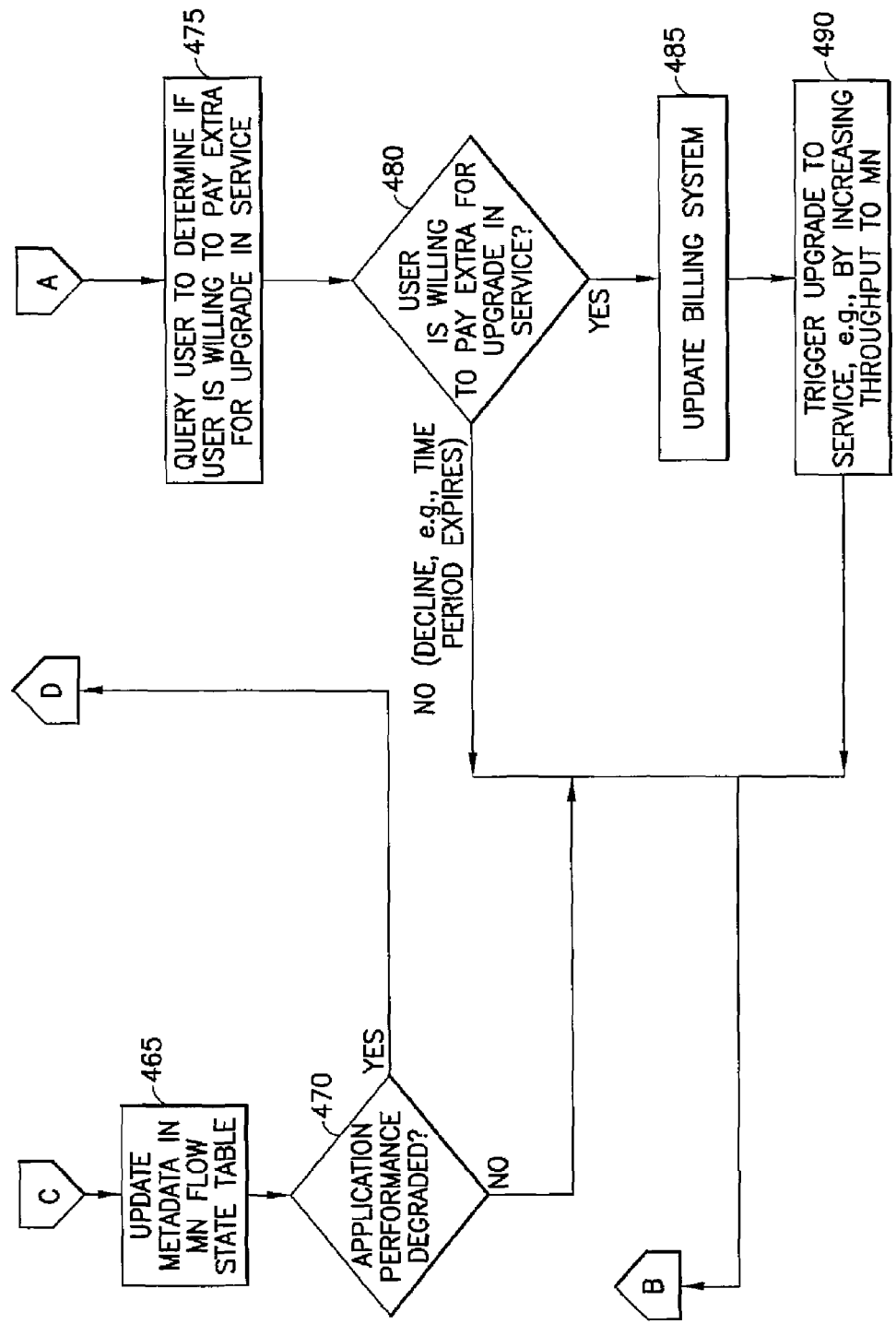

Referring now to FIG. 4 in addition to FIGS. 1-3, this figure illustrates a flowchart of a method for application performance improvements in radio networks in accordance with an exemplary embodiment of the instant invention. The method is performed, e.g., by the IOG 160 and its corresponding constituents the DPI engine 220, the proxy radio resource manager 320, and the proxy billing manager 360. This method (and the methods shown in any other figure) may be performed by the computer program code (e.g., 187, 197) executed by processors (e.g., 171/192), or could be executed via hardware (e.g., instructions encoded through circuitry in an integrated circuit), or some combination of these. It is again noted that the IOG 160 is merely one example of a device suitable for performing operations in accordance with exemplary embodiments of the instant invention. Other device(s) and locations may be used.

In broad and non-limiting terms, the method of FIG. 4 operates as follows. Based on input from the DPI engine 220, the proxy billing manager 360 would decide if the mobile node 190 is trying to access premium content or not. Premium content is content the existing service of the user does not support and consequently, there is a compromised quality of experience for the user for that content. If the user is trying to access premium content and the user does not have the appropriate QoS to maintain access to the premium content, the proxy billing manager 360 will perform certain activities in exemplary embodiments.

As one example, the proxy billing manager 360 can inject application layer messages to notify the user that that he/she should switch to a premium service (e.g., upgrade the existing service) to receive better performance. One option for the transfer to the premium service is if the user pays for the premium service. That is, if the user accepts switching to a premium service, the proxy billing manager 360 would interact with the PCRF 340 to, e.g., modify the QoS of the user. The proxy billing manager 360 will also interact with appropriate core network entities to modify subscription information (including billing) of the user.

As another example, the proxy billing manager 360 may inject appropriate signaling messages to users, where each user can decide to choose upgrade to a premium service without paying extra subscription fees by giving up some of his or her rights. For example, in this case, a user will give a right to the operator to monetize a data service by injecting appropriate advertisement content into an application flow. In this example, the proxy billing manager 360 will interface with Internet advertisement or local advertisement server(s) 380 to download appropriate content and push that advertising content to the user device (mobile node 190). An operator can also decide to embed an advertisement into existing media in an application flow. This approach would enable the operator to generate revenue from the advertisements and at the same time provide premium content to users who are interested in enjoying premium content without paying an extra subscription fee.

The method in FIG. 4 begins in block 405, when the IOG 160 receives and processes packets from the mobile node (MN) 190 and the core network (CN). The core network in this example includes the SGSN 130 and the GGSN 140. In block 410, the IOG 160 (using the DPI engine 220 and its deep packet scan of packets 131) determines if a message is a control message. If so (block 410=YES), the DPI engine 220 obtains the mobile node 190 MN identification (ID), device capability, and user policy, and creates user context in the flow state table 241 (see block 240 of FIG. 2). Block 420 is reached if no control message is found (block 410=No).

In block 420, the DPI engine 220 performs deep packet inspection. In block 425, the DPI engine 220 determines if there is a new application flow detected. An application flow is a data flow that corresponds to an application executing on the mobile node 190. If so (block 425=Yes), the mobile node 190 flow state is updated (in the flow state table 241; see also block 240 of FIG. 2) (block 430). In block 435, it is determined if the mobile node 190 has the necessary QoS to support a new application flow. If so (block 435=Yes), the method continues in block 405. If the mobile node 190 does not have the necessary QoS to support the new application flow (block 435=No), this is one example of a compromised quality of experience for the user of this new application flow. The method proceeds to block 437, described below.

If a new application flow is not detected (block 425=No), the method continues in block 460. In this example, the IOG 160 processes DPI protocol metadata, based on multiple packets 131. For instance, the proxy radio resource manager 320 could determine the MOS score of voice or a video session corresponding to the user and store this as metadata. The proxy radio resource manager 320 could also determine the round trip time (RTT) of packets over the core network and store this as metadata. Metadata includes such information as application response time (e.g., RTT), latency, throughput, jitter, packet loss, mean opinion score, rfactor (voice transmission rating quality), and the like. In block 465, the mobile node 190 flow state is updated (in the flow state table 241; see also block 240 of FIG. 2). In block 470, using the metadata, the IOG 160 determines whether the application performance for one or more application flows corresponding to the user is degraded. If not (block 470=No), the method continues at block 405.

Figure 6:
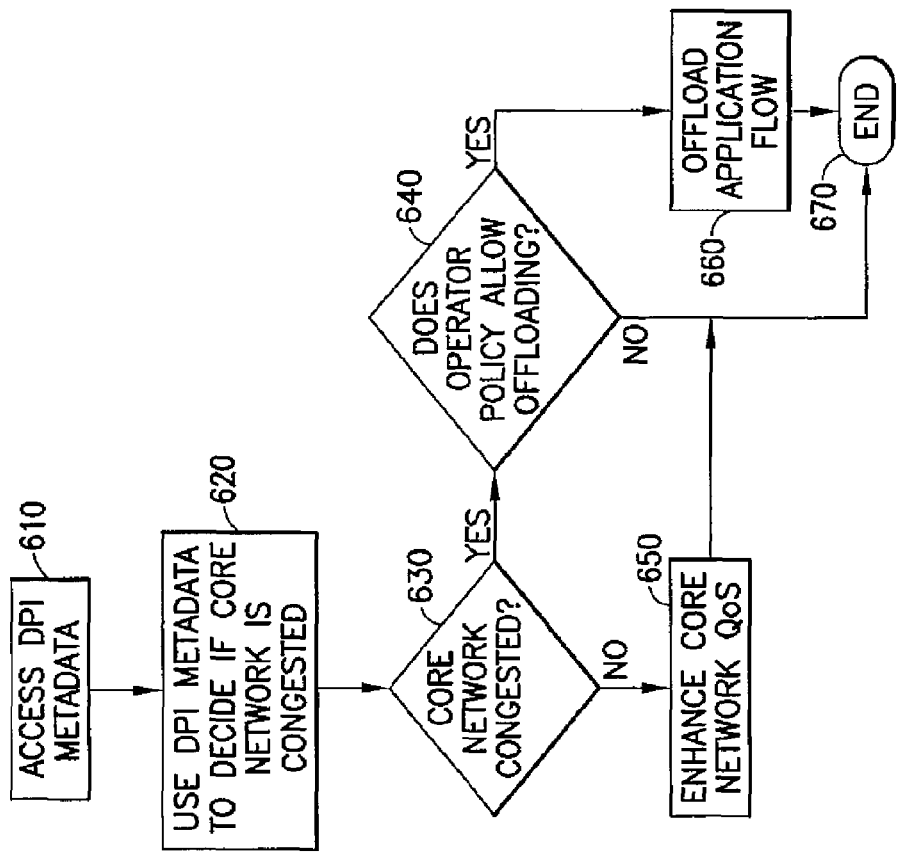
FIG. 6 illustrates a flowchart of a method to upgrade service for a user using core network techniques for application flows from a radio network to an MN in accordance with an exemplary embodiment of the instant invention.

If so (block 470=Yes), this is another example of a compromised quality of experience for a user of the one or more application flows for which the application performance is degraded. Both blocks 470 (if block 47-=Yes) and block 435 (if block 435=No) can end up at block 437, which is where user is queried to determine if the user is willing to entertain advertisements in order for the user's existing service to be upgraded, e.g., to support the application flow(s) requested by the user or at least to improve the quality of experience for the user from the current compromised quality of experience. In block 440, it is determined if the user is willing to entertain advertisement for upgrade in service. If block 440=No, this means the user continues under the existing service, which means the new application flow 109 may not be supported or the application performance may remain degraded. Further, it should be noted that the user can decline the upgrade in service by not responding within a predetermined time period. That is, the user might ignore any message(s) asking the user to entertain advertisements for the upgrade in service. If so (block 440=Yes), the IOG 160 informs (block 445) the mobile node 190, such as by injecting a message into an application flow, and the IOG 160 triggers (block 450) an upgrade to the service, e.g., by increasing throughput to the mobile node 190. Techniques for upgrading the service are shown in FIGS. 5 and 6 (and also FIGS. 10-14), and one or more of these may be used. The methods shown in FIGS. 5 and 6 may be triggered, meaning that the methods may be performed multiple times to improve the service to the upgraded service.

In block 455, the IOG 160 injects appropriate advertisement content 111 for the mobile node into the application flow 109, to create the application flows 106. The injecting can include the advertisement content into content (such as video, hypertext markup language content, and the like) in the application flow 109 to create the application flow 106 with advertising content 111. The advertising content 111 is therefore viewed as part of the content on the display 199 of the mobile node 190 (see FIG. 9A, described below). As another example, the application flow 109 includes content to be viewed in a first window on the display of the mobile node 109. The advertisement content 111 is injected so that the advertising content 111 is viewed in a second window separate from the first window (see FIG. 9B, described below).

It is assumed that the application flows 109 are IP flows and that the user is using a browser to view the IP flows. However, the user might not be using a browser. In this case, if a browser-based approach is used for the query and other interactions, the browser should run in the background all the time. Alternatively, there should be a background application that will spawn the browser as soon the background application receives a message from the IOG 160.

A possibility not requiring the use of a browser is using an application push notification service or similar service: Basically, a push notification service is used by some platforms to inform a user that an application is trying to connect the mobile node 190 of the user. The application push notification service can be used when a user is playing a game with a partner and somehow the user accidentally closes the gaming application. For example, as soon as the other player makes a gaming move, the application push notification service can spawn the gaming application on user's mobile node. Similar techniques may be used here.

Another possibility not requiring the use of a browser is the following. An operator can install an app (application) on a smart phone that can receive notification from the IOG 160 and display that on the application for the mobile node 190.

After block 455, the method proceeds to block 405. If the user is not willing to entertain advertisements for an upgrade in service (block 440=No), the method proceeds to block 475, where the IOG queries (block 480) the user to determine if the user is willing to pay extra for the upgrade in service. If not (block 480=No), the method proceeds to block 405. Note that this means the user continues under the existing service, which means the new application flow 109 may not be supported or the application performance may remain degraded. Further, it should be noted that the user can decline the upgrade in service by not responding within a predetermined time period. That is, the user might ignore any message(s) asking the user to pay extra for the upgrade in service.

If the user is willing to pay extra for the upgrade in service (block 480=Yes), in block 485, the IOG 160 (e.g., using the proxy billing manager 360) updates the billing system. In block 490, the IOG 160 upgrades the service of the user, e.g., by increasing throughput to the mobile node 190. Techniques for upgrading the service are shown in FIGS. 5 and 6 and in FIGS. 10-14, and any one or more of these may be used. The methods shown in FIGS. 5 and 6 may be triggered, meaning that the methods may be performed multiple times to improve the service to the upgraded service. The method proceeds again to block 405.

Referring now to FIG. 5 with appropriate reference to other figures, this figure illustrates a flowchart of a method to upgrade service for a user using radio resource techniques for application flows from a radio network to a mobile node 190 in accordance with an exemplary embodiment of the instant invention. This method may be performed, e.g., by the proxy radio resource manager 320 in the IOG 160. In block 510, based on input from the DPI engine 220, the proxy radio resource manager 320 infers real-time performance of the application or of the application flows corresponding to the application. In block 520, the proxy radio resource manager 320 determines if the scheduler, media access control (MAC) layer, and/or the physical (PHY) layer are using a fully optimized configuration for specific application for this user. If not (block 520=No), the proxy radio resource manager 320 triggers (block 540) the scheduler, MAC layer, and/or PHY layer to perform application-aware scheduling decision. It is also noted that the configuration depends on the particular system. In LTE (long term evolution), the MAC/PHY/scheduler is part of eNodeB (evolved Node B). However, in UMTS, the MAC/scheduler can be split between NodeB and RNC. The PHY layer will be part of NodeB. For example, the proxy radio resource manager 320 could inform the scheduler and a modem application (a MAC/RLC/PDCP/scheduler and some call processing functionality) that a MOS score of voice (for one application) or a video session (for another application) of a user has fallen below a threshold so the scheduler and/or or modem can start performing one or more of the following optimizations:

1) Start using a more conservative modulation and coding scheme (MCS) so that over-the-air packets are exchanged without requiring multiple hybrid automatic repeat request (HARQ) re-transmissions;

2) Bump up the scheduling priority of mobile node 190 so that mobile user is able to get downlink (DL) and/or uplink (UL) grant quickly enough and thereby minimize RTT of packets communicated by the mobile node 190;

3) Send proactive grant in uplink to the mobile node to ensure that mobile node is able to quickly send uplink data; or 4) Enable advanced features such as beam-forming. The following are example beam-forming optimizations that can be performed in, for instance, an LTE network. The network can use real-time application performance as a trigger to dynamically adjust the periodicity of CQI/RI/SRS reporting. Then, if deep packet inspections indicate that end-to-end application performance is stable, the network will trigger RRC to inform the UE to reduce the periodicity of CQI/RI/SRS reporting. However, if the application performance degrades significantly, the RRC will inform UE to report CQI/RI/SRS feedback more frequently. The network can use real-time application performance as a trigger to decide if a radio signal associated with a mobile node can be sent over how many antenna of an antenna array. For example, if end-to-end application performance is stable, the eNodeB can send the radio signal over only a few transmit antennas and thereby minimize DL (downlink) radio processing overhead in the eNodeB. However, if end-to-end performance is not stable, the eNodeB will try to send downlink signal over all available antenna to achieve the better diversity again.

If elements (1)-(4) (or other suitable elements) have been performed, and no elements remain to be performed, then the scheduler, MAC layer, and PHY layer have been optimized and the result for block 520 would be Yes. That is, if the proxy radio resource manager 320 does not notice improvement in, e.g., audio or video quality of a user in spite of sending repeated triggers, the proxy radio resource manager 320 would send a trigger to the RRC to initiate a handover procedure. This occurs in block 530. The RRC would utilize network triggers along with radio link conditions to make appropriate handover decisions for the user. For example, the RRC would handover user to a less congested cell or even to different radio access network where desired quality of experience can be maintained. If the RRC is unable to handover the user to different cell or radio access technology (RAT), the proxy radio resource manager 320 could also interact with PCRF 340 to enhance the QoS of the user.

Turning now to FIG. 6 in addition to other figures, FIG. 6 illustrates a flowchart of a method to upgrade service for a user using core network techniques for application flows from a radio network to a mobile node in accordance with an exemplary embodiment of the instant invention. The method of FIG. 6 may be performed, e.g., by the IOG 160. In block 610, the IOG 160 accesses DPI metadata. In block 620, the IOG 160 uses the DPI metadata to decide if the core network is congested. For instance, the DPI engine 220 could mark the state of the core network as congested if the DPI engine 220 determines that metadata associated with various flows indicate the following characteristics:

Round trip time (RTT) between the mobile node and correspondent node (e.g., handling content 105 in the Internet 170) has increased beyond an expected threshold partly due to congestion in the core network; or The radio network 100 is not able to maintain the current quality of experience of a user and the DPI engine 220 determines that by minimizing delay over the network of the operation, the DPI engine 220 can significantly improve the quality of experience of the user even if the core network is not congested.

On the other hand, the DPI engine 220 might determine that policy indicates that parental control is enabled for a given user. Based on this determination, the DPI engine 220 could determined that the packets for this application should be sent to the core network (and block 630=No in this instance). This is because if the packets are offloaded, there may not be parental control.

Based on input from DPI engine, the IOG 160 would determine (block 630) if IP packets need to be offloaded or not. If so (block 630=YES), in block 640, the IOG 160 determines if the operator policy allows offloading the data flow. If so (block 640=Yes), in block 660, the application flow is offloaded. If not (block 640=No), the method ends in block 670.

If the core network is determined not to be congested (block 630=No), the IOG 160 (e.g., via the proxy radio resource manager 320) could also interact with PCRF 340 to enhance the QoS of the user (block 650). The method ends in block 670.

Figure 7:
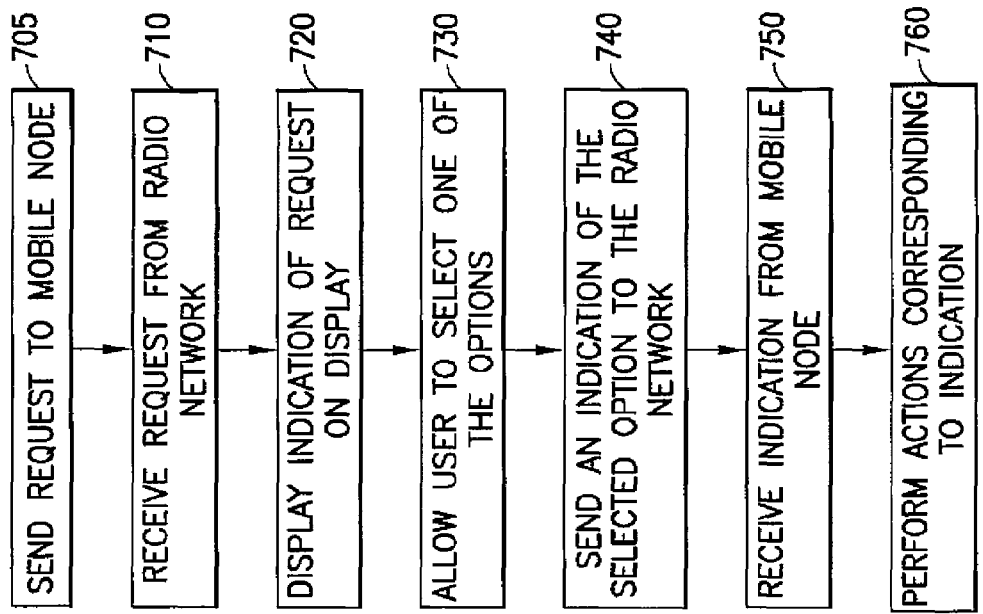
FIG. 7 illustrates a flowchart of an exemplary method performed by a radio network and a mobile node for certain portions of the method shown in FIG. 4.

Referring to FIG. 7, FIG. 7 illustrates a flowchart of an exemplary method performed by a radio network and a mobile node for certain portions of the method shown in FIG. 4. The queries made in blocks 437 and 475 may be performed by certain of the blocks in FIG. 7. For instance, to query the user, the radio network 100 (e.g., under control of the IOG 160) could send a request in block 705 to the mobile node 190 of the user. The mobile node receives the request (block 710) and then displays an indication of the request in block 720.

Figure 8A:
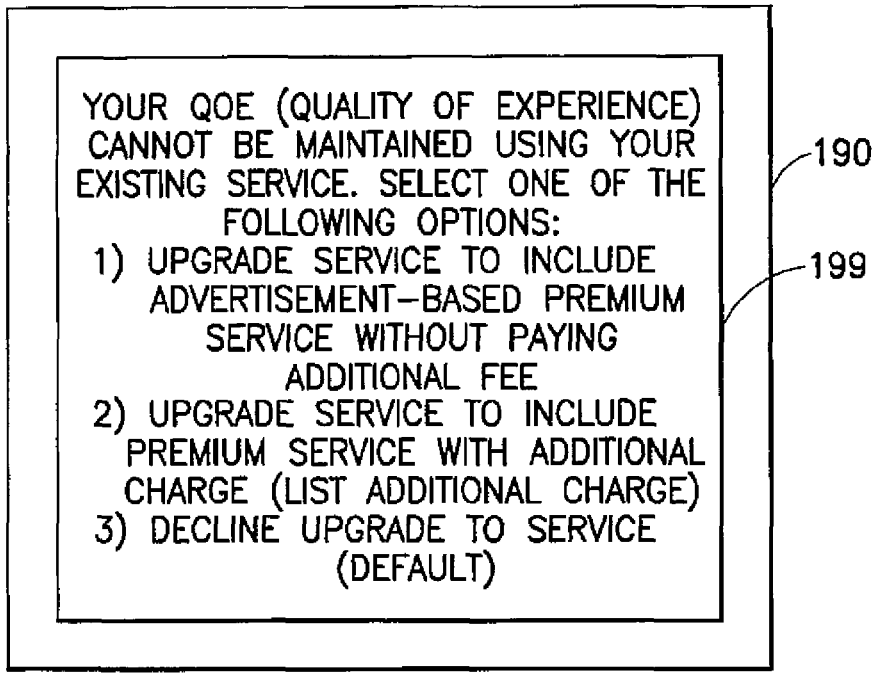
Figure 8B:
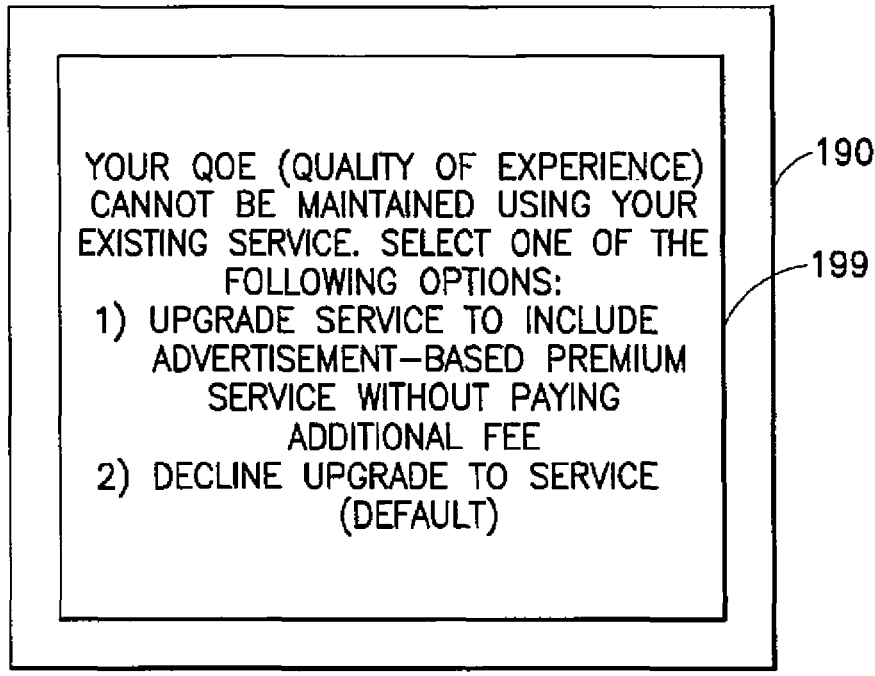

In FIG. 4, it is not necessary to perform both blocks 440 and 480 (only one could be performed) or perform those blocks in the order shown. This is illustrated in more detail below. For instance, FIGS. 8A, 8B, and 8C illustrate different displayed representations of requests for a user to select an option from a number of options. In FIG. 8A, three options are presented to the user (on the display 199 of the mobile node 190): 1) upgrade service to include advertisement-based premium service without paying additional fee; 2) upgrade service to include premium service with additional charge (list additional charge); or 3) decline the upgrade to the service (i.e., continue with existing service) (default). The text "list additional charge" means a charge selected by the operated would be listed in this location. By contrast, in FIG. 8B, two options are presented to the user: 1) upgrade service to include advertisement-based premium service without paying additional fee; or 2) decline the upgrade to the service (i.e., continue with existing service) (default). As another example, in FIG. 8C, two options are presented to the user: 1) upgrade service to include premium service with additional charge (list additional charge); or 2) decline the upgrade to the service (i.e., continue with existing service) (default).

In block 730 of FIG. 7, the mobile node 190 allows the user to select one of the options, the sends (block 740) an indication of the selected option to the radio network 100 (e.g., to the IOG 160 via the Node B 115 and the RNC 120). The radio network 100 receives the indication from the mobile node 190 (block 750). In block 760, the radio network 100 (e.g., the IOG 160) performs actions corresponding to the indication.

For instance, if the options shown in FIG. 8A were sent via a request to a user, if the user selected option 1, the IOG 160 would perform blocks 445, 450, and 455 of FIG. 4. If the user selected option 2, the IOG 160 would perform blocks 485 and 490 of FIG. 4. If the user selected option 3, the IOG 160 would keep the service at the current level and the user would continue to experience a compromised quality of experience. In FIG. 8B, there is no option for the user to select of "upgrade service to include premium service with additional charge (list additional charge)". Therefore, in block 760, the IOG 160 would never perform blocks 437, 440, 445, 450, and 455. Similarly, in FIG. 8C, there is no option for the user to select of "upgrade service to include advertisement-based premium service without paying additional fee". Therefore, in block 760, the IOG 160 would never perform blocks 475, 480, 485, and 490. These are merely exemplary and other embodiments are possible.

FIGS. 9A and 9B show two exemplary techniques for displaying to a user an advertisement received in an application flow and how that advertisement might be added to the application flow. In FIG. 9A, the content 910 associated with an application flow 106 takes up the entire display 199, and the advertisement 920 is embedded in the content. The IOG 160 would embed the advertisement 920 in the content 910 as that content 910 is taken out of the flow 190 and put back into the flow 160. The advertisement 920 might be translucent to a certain degree and may disappear after a time. In the example of FIG. 9B, the advertisement 920 is put into a window 930 that pops up above the content 910. The IOG 160 would embed the advertisement 920 into the application flow 160, but not into the content 910. For instance, the window 930 and its advertisement 920 could be enabled using HTML and added to the flow 190 to create the flow 160.

In addition to the techniques described above for improving QoS and corresponding throughput for a mobile node, another technique for improving QoS is now presented. Mobile nodes are unable to sustain higher data rates at an edge of a cell created by a wireless access point. For instance, a scheduler (part of the access point or connected thereto) uses radio link feedback to appropriately adjust data rate of a user when the user moves to the cell edge. It would be beneficial if a mobile node and its correspondent access point utilize end-to-end feedback to detect the reduced data rate at the cell edge and appropriately adjust the data rate. However, adjustment of the data rate is only possible currently in certain situations.

Furthermore, wireless operators are encountering exponential growth in non-value-added Internet traffic (e.g., video, P2P (point to point), Web browsing). The 3GPP (third generation partnership project) is working to standardize solutions to offload Internet traffic at the edge of the cell or RAN (radio area network). Start-ups, core network solutions providers, and Pico/Femto solution providers are working on solutions that would help break out or offload Internet traffic at the edge of the RAN or enterprise or home and deliver the traffic to the nearest Internet interconnect or service LAN.

Various video optimization solution providers are working to provide a solution, also known as a video optimizer that monitors video content on the GN/PI interface (GGSN/PDSN to Internet point of presence) and optimizes video content based on core network congestion feedback or perceived quality of network condition between video optimizer and destination device receiving video content. Given that the video optimizer is located in core network, it is not able to customize the video content to accurately match the exact data between base station and mobile node. As is known, a GGSN is a general packet radio service gateway serving node and a PDSN is a packet data service node.

As stated above, an exemplary problem is that a wireless node that is, e.g., near a cell edge typically cannot sustain a higher data rate. However, a user would still prefer to receive application data associated with the higher data rate. This is particularly true for applications such as video, where a user is viewing video. The instant disclosure proposes in exemplary embodiments a link layer assisted application improvement that can in an exemplary embodiment compress streams such as video (e.g., including associated audio) to reduce over-the-air data rate especially when a user moves toward the edge of the cell.

In an exemplary embodiment, the IOG will utilize deep packet inspection to identify various data flows between a mobile node and a correspondent Internet node in a media session. The IOG will, for example, monitor control messages exchanged between the mobile node and core network gateways to obtain, e.g., mobile node identity and device capability. The IOG will interact with a policy server to obtain user policies. The IOG will interact with radio network elements to receive as examples the following non-limiting reports to determine if user is in near/mid/far locations (relative to an access point and the cell created by the access point): CQI (channel quality information), PMI (precoding matrix index), SRS reports (sounding reference signals), or RSRP (reference signal receive power) or RSRQ (reference signal receive quality) measurement reports. The IOG will perform one or more of the following exemplary optimizations on video, audio and other media flows in the following exemplary and non-limiting manners:

1) If a user is in a mid or far location, the IOG will transcode video content, audio content, or potentially other content to an appropriate lower data rate so that application content can be delivered to the mobile node using, e.g., a lower data rate channel.

2) If the user is in a near location, the IOG will check the device capability (e.g., indicated by a device type) of the user. If the user is using a device having a lower resolution screen for instance, the IOG will transcode video content to a lower data rate to minimize overall impact on sector throughput.

3) Upon receiving congestion indication from radio network elements, the IOG can select lower priority users and then appropriately transcode their video and audio content while, e.g., leaving the video and audio content of higher priority users alone.

The IOG will also interact with a CDN (content delivery network) to download cached content from CDN server and therefore provide media having a reduced media coding rate to the user.

Figure 10:
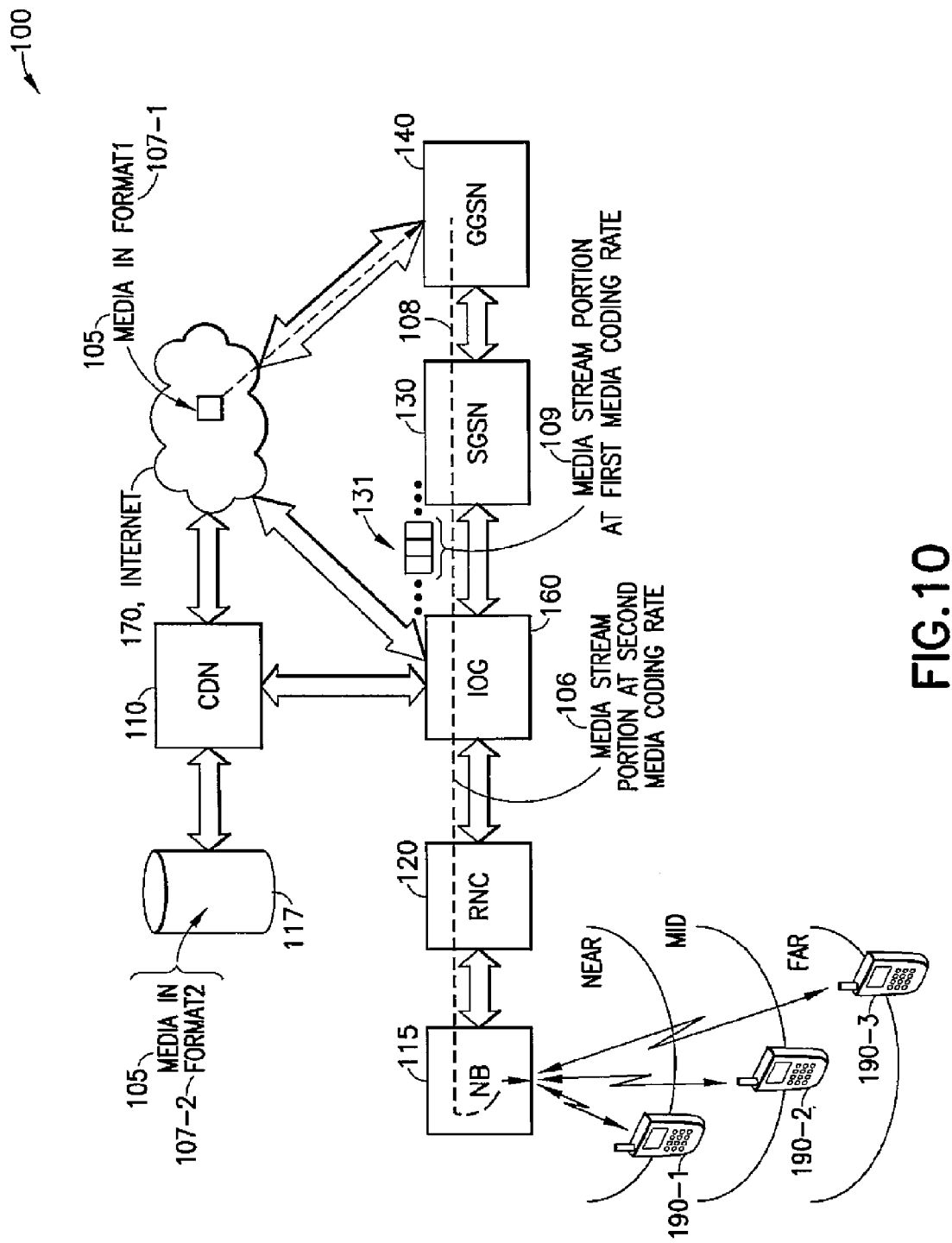
FIG. 10 illustrates a simplified block diagram of another system into which exemplary embodiments of this invention may be practiced.

An exemplary system into which exemplary embodiments of this invention may be practiced is shown in FIG. 10. Since this figure is similar to FIG. 1, only differences will be described here. The system includes a data store 117 (storing media 105 in format 107-2), a content delivery network (CDN) 110, a Node B 115, and three mobile nodes 190-1 through 190-3.

One of the mobile nodes 190 accesses content 105, in this example media 105 in format1 107-1, in the Internet 170 during a media session. For instance, the media 105 could be a video of a television show or a movie. The radio network 100 (e.g., the GGSN 140 and the SGSN 130) creates the stream 108 (in this example, a media stream 108) from the media 105 in format1. The format1 could be, e.g., the H.264 SVC or MVC format. SVC means scalable video coding and MVC means multiview video coding. An SVC video encoder allows a video encoder to encode a video into multiple streams: a base stream and several enhancement streams. The decoder has the option to reconstruct the video image by combining the base stream with one or more of the enhancement streams. The IOG 160 can make a decision about how many streams to send a mobile node 190 based on radio link condition. Similarly, H.264 MVC can send multiple encoded views of a video session to a receiver. The receiver can combine data received about multiple video views to produced different qualities of an image. For example, the receiver can combine more than video to produce 3D (three dimensional) image or higher quality video image. The IOG 160 can selectively suppress video data associated with one or more videos based on link layer feedback.

As part of the media session, the radio network 100 forwards the media stream 108 to the associated mobile node 190, and the Node B 115 wirelessly communicates the media stream 108 to the associated mobile node 190. The media stream 108 includes packets 131. As part of the media stream 108, there is an application flow 109 that is a media stream portion 109 (comprising three of the packets 131 in this example) that enters the IOG 160. The IOG 160 then can create another application flow 106, in this case media stream portion 106, at a second media coding rate. As described in more detail below, one way to create the media stream portion 106 at a second media coding rate is to download the media 105 (or a portion thereof) in format 2 107-2, where a media stream portion 109 created from format1 107-1 has (as an example) a higher media coding rate than does the media stream portion 106 created from format2 107-2. It is also possible to perform transcoding of the media in the media stream portion 109 to move from a current media coding rate of the media stream portion 109 to a new media coding rate of the media stream portion 106.

Figure 11:
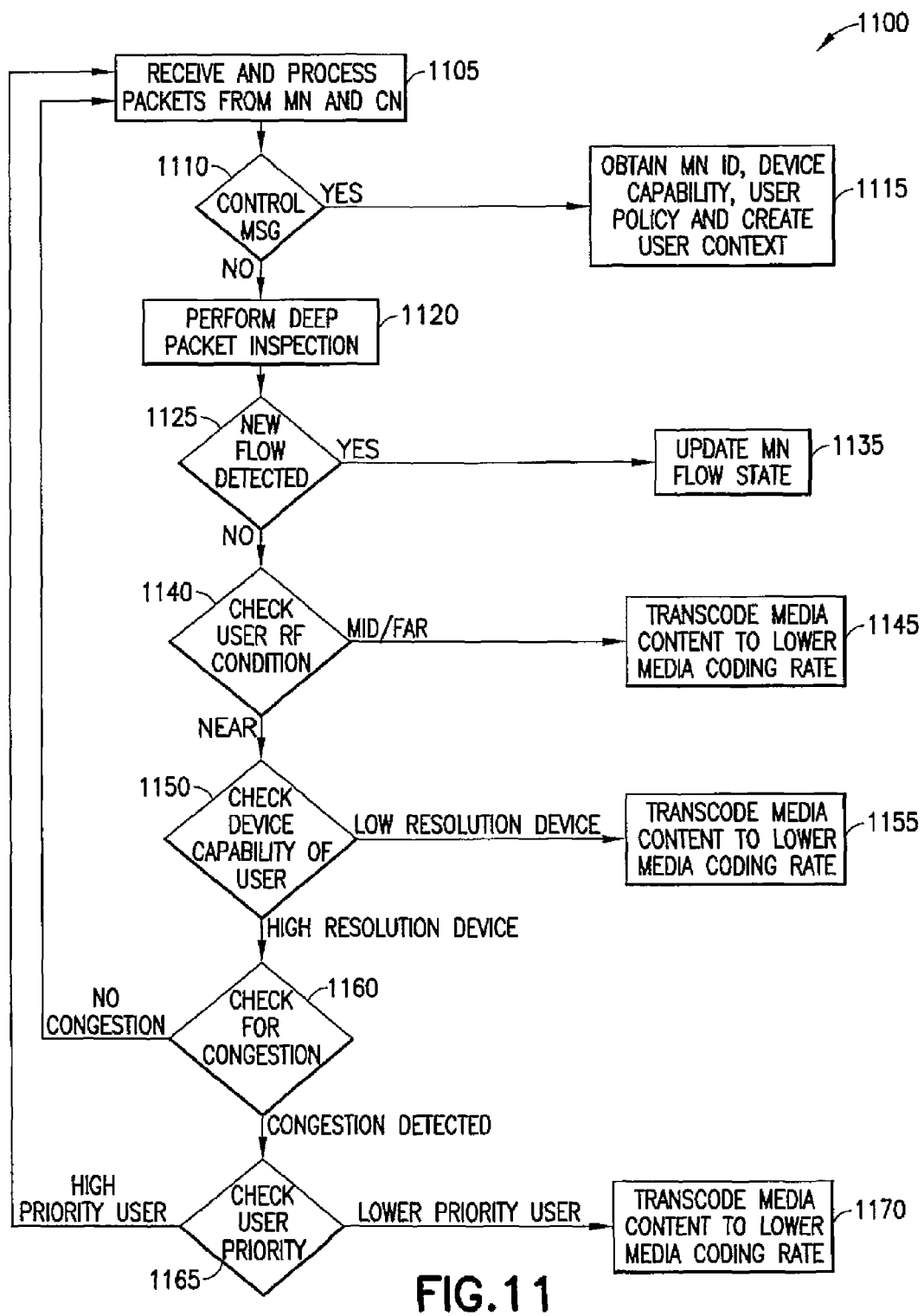
FIG. 11 illustrates a flowchart of a method for performance improvements in radio networks in accordance with an exemplary embodiment of the instant invention.

Further aspects of FIG. 10 are described in reference to FIG. 11. Referring now to FIG. 11, this figure illustrates a flowchart of a method for link layer assisted performance improvements in accordance with an exemplary embodiment of the instant invention. FIG. 11 is performed by, e.g., the IOG 160 and its DPI module 220. More specifically, the method in FIG. 11 may be performed by an apparatus such as a computer under the control of the one or more processors 171 (see FIG. 1) executing the computer program code 187 in the one or more memories 180.

The method 1100 beings in block 1105, when the IOG receives and processes packets from the mobile node (MN) and the core network (CN). In this example, the CN is the SGSN 130 and the GGSN 140, but these elements are merely exemplary. Additionally, the packets 131 are received by the IOG from the SGSN, but this also is merely exemplary and the IOG 160 can receive packets from another element (or elements).

In block 1110, the IOG 160 using the DPI module 220 determines if a message in a packet 131 is a control message (msg). If so (block 1110=Yes), in block 1115, the DPI module 220 obtains (as examples) an identification (ID) of the mobile node 190, device capability (e.g., screen resolution or resolutions that can be handled by the mobile node 190) of the mobile node 190, or user policy for the mobile node 190. Based on this information, the DPI module 220 creates user context for the user corresponding to the mobile node 190.

If block 1110=No, block 1120 is performed. In block 1120, the DPI module 220 performs a deep packet inspection, e.g., by DPI analysis of bearer data. Such deep packet inspection techniques are known. In block 1125, it is determined if a new flow is detected of a media stream 108 for a current media session. If so (block 1125=yes), the mobile node 190 flow state is updated (see also block 241 of FIG. 2).

In block 1140, the RF condition of the user (i.e., mobile node 190) is checked. In this example, location is determined using radio signal strength from mobile device. The following are example metrics that are reported by LTE (long term evolution) devices: 1) CQI/PMI/SRS reports; and/or 2) RSRP/RSRQ measurement reports. Based on numerical value(s) of one or more of these metrics, one can deduce if a mobile node is in near location (mobile node 190-1), mid location (mobile node 190-2), or far location (mobile node 190-3). If the user is in a mid location (mobile node 190-2) or a far location (mobile node 190-3) (block 1140=mid/far), the IOG will transcode media content to an appropriate lower coding rate (block 1145). If the user is in a near location (mobile node 190-1) (block 1140=near), the IOG 160 will check the device capability of the mobile node 190-1 of the user. If the user is using a low resolution device (block 1150=low resolution device), the IOG 160 will transcode media to a lower media coding rate, e.g., to minimize overall impact on sector throughput (block 1155). Block 1160 is performed in response to the device capability being indicated as a high resolution device.

A determination of the high or low resolution of the device is determined using, e.g., the device capability determined in block 1115. The qualifiers of "high" and "low" resolution are typically relative to the current media coding rate. That is, if the current media coding rate has a resolution of 720×540 pixels at a bit rate of 1000 kbps (kilobits per second), and the resolution of the mobile node 190 supports the 720×540 pixels resolution, the device capability then might qualify as a high resolution device. However, if the resolution of the mobile node 190 is 480×360 pixels, then the device capability should qualify as a low resolution device and the media content can be transcoded to a lower media coding rate. Alternatively, the qualifiers of "high" and "low" resolution could be fixed (e.g., above 480×360 pixels could be a high resolution device, while at or lower than 480×360 pixels is a low resolution device). However, if the mobile node 190 is considered to be a low resolution device (say, 480×360 pixels), but the current media coding rate is based on a lower resolution (e.g., 240×320 pixels), the media content might not be transcoded to an even lower resolution.

It should be noted that a media coding rate maybe based on a number of factors. For instance, the resolution in terms of the number of pixels used to display video is one such factor. Another factor is the frame rate (e.g., number of frames per second) used to display video. A further factor is the number of bits of information used for each pixel. An additional factor is the coding scheme used to code the video. Similar factors also exist for audio. As an example, uncompressed audio can be sampled with different number of bits per sample and at different sampling rates and may also be compressed using different compression schemes.

In block 1160, upon the IOG 160 receiving a congestion indication (block 1160=congestion detected) from one or more radio network elements such as a base station (e.g., Node B 115) or an RNC 120, the IOG will select one or more lower priority users (block 1165=lower priority user) and transcode the media content of the lower priority user to a lower media coding rate (block 1170). Higher priority users would not have their media content transcoded (block 1165=high priority user, and processing proceeds to block 1105). Furthermore, if there is no congestion (block 1160=no congestion), processing proceeds to block 1105. In order to identify higher priority user, the IOG 160 will use the user policy and user context (e.g., user preference, service profile) determined in block 1115. In addition to snooping various UE specific control messages (block 1115), the IOG 160 can obtain user specific policy information from a policy server.

In certain instances, the IOG 160 will also interact with the CDN 110 to download cached content from a CDN server. This is explained in more detail in reference to FIG. 6.

The blocks and paths through FIG. 11 are merely exemplary. For instance, processing after block 1135 could continue at block 1140. Additionally, the blocks 1145, 1155, and 1170 may all transcode media content to the same lower media coding rate or one or more of these blocks could choose different lower media coding rates. Illustratively, the media coding rate selected in block 1145 might be lower than the media coding rate selected in block 1155, e.g., so that a user with a poor RF condition still receives some media content, even if the media content has, e.g., very low resolution.

FIG. 11 placed emphasis on reducing the media coding rate. However, the media coding rate may also be increased from a current media coding rate in certain instances. One simple example of this is embedding advertisement video content into the original video content. The IOG 160 can determine to add different resolution advertisement video content to original content if, e.g., the radio link condition is above average.

Figure 12:
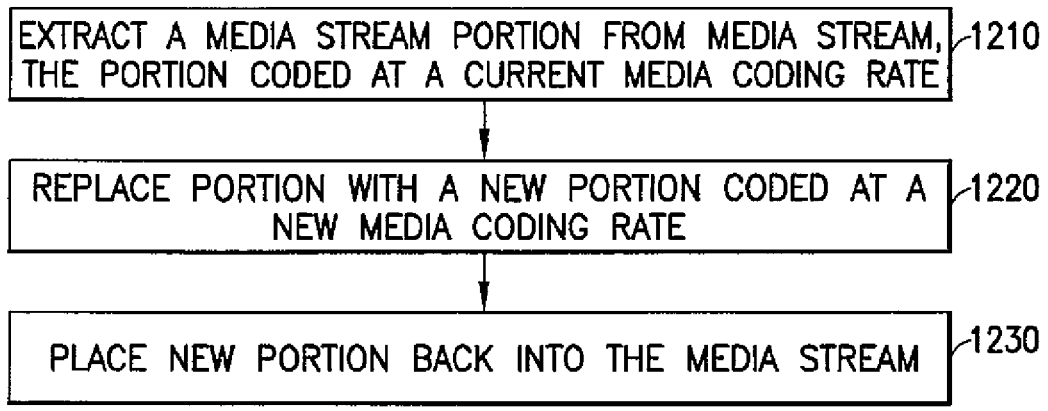
FIG. 12 illustrates a flowchart of a method to allow transcoding of media content and other operations on that content to occur.

Blocks 1145, 1155, and 1170 of FIG. 11 are directed to transcoding of media content in a media stream. FIG. 12 is a method performed, e.g., by the IOG 160 (e.g., using the DPI module 220) in order to allow the transcoding of media content and other operations on that content in a media stream 108 to occur. In block 1210, the IOG 160 extracts a media stream portion 109 from the media stream 108. The portion 106 is coded at a current media coding rate. In block 1220, the IOG 160 replaces the portion 109 with a new portion 106 coded at a new media coding rate. In block 1230, the IOG 160 places the new portion 106 back into the media stream 108 for delivery to the corresponding mobile node 190. That is, once the media stream portion 109 is extracted, transcoding may be performed on the media stream portion 109 or the current media coding rate of the media stream portion 109 can be modified in other ways, such as using the CDN to download content.

Figure 13:
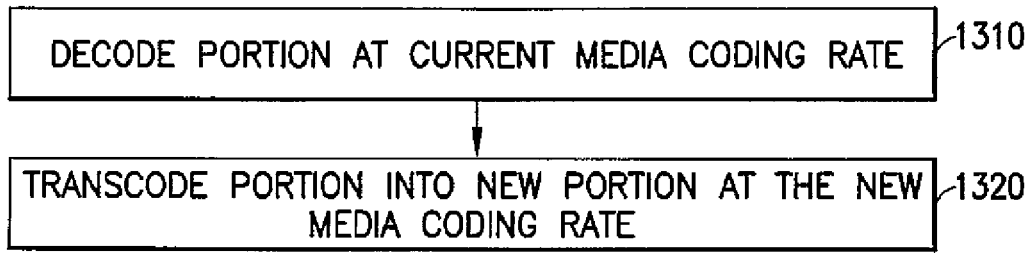
FIG. 13 illustrates a flowchart of a method for generating a new portion of a media stream coded at a new media coding rate from a portion of the media stream coded at a current media coding rate.

Referring to FIG. 13 along with the previous figures, FIG. 13 illustrates a flowchart of a method for generating a new portion of a media stream coded at a new media coding rate from a portion of the media stream coded at a current media coding rate. That is, FIG. 13 presents an example that would occur before block 1220 of FIG. 12. In block 1310, the extracted portion 109 of the media stream 108 is decoded. In block 1320, the decoded portion is transcoded into a new portion 106 meeting the new media coding rate. As an example, the transcoding could be performed by modifying (for video media) resolution of the portion to a different resolution for the new media coding rate. The transcoding could further include reducing the frame rate or number of bits per pixel for video media. It is also possible to transcode using different codecs (coder-decoders), but this would entail additional steps such as determining whether the mobile node 190 supports the new codec. Audio codecs support different data rate frames. For example, EVRC-B audio codecs can have full rate frame, ½ (one-half) rate frame, ¼ (one-quarter) rate frame. The transcoder can take full rate frame and convert this data to ½ (one-half) rate frame. Block 1220 of FIG. 12 then uses the new portion created in block 1320 to replace the original portion.

Figure 14:
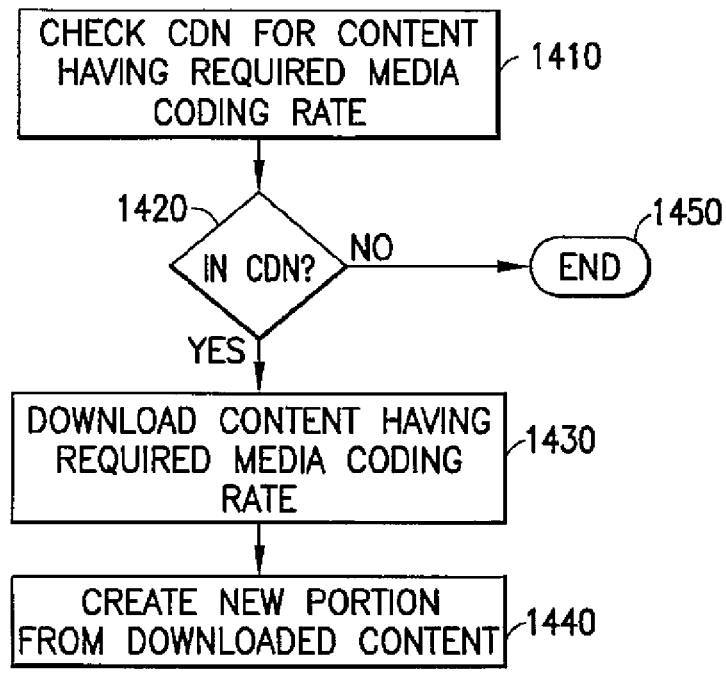
FIG. 14 illustrates a flowchart of a method for retrieving content to be used for a new portion of a media stream.

Turning to FIG. 14 in addition to other figures, FIG. 14 illustrates a flowchart of a method for retrieving content to be used for the new portion of a media stream. Typically, FIG. 14 is performed before block 1220 of FIG. 12. In block 1410, the IOG 160 checks the CDN 110 for content having the required media coding rate for the portion 106. That is, the CDN 110 has access to a store 117 having media 105 in format2 107-2. For instance, the media stream portion 109 is created using the media 105 in format1 107-1 and format1 107-1 may be a high definition 720*p* (where "p" stands for progressive) television signal. The format2 107-2 could be a version of same media 105 in a smaller format (e.g., 480*i*, where "i" stands for interlaced).

If the content (e.g., media 105 in format2 107-2) is found in the CDN (block 1420=yes), in block 1430, the IOG 160 downloads the content. In block 1440, the IOG 160 creates the new portion from the downloaded content. It should be noted that this process may be able to be performed if the user is in the "middle" of viewing media, such as in the middle of viewing a video. For instance, if a synchronization frame can be determined, the process should be able to be implemented. Block 1220 of FIG. 12 then uses the new portion to replace the original portion. If the content (e.g., media 105 in format2 107-2) is not found in the CDN (block 1420=no), the method ends in block 1450 (e.g., and another technique such as the operations in the method of FIG. 5 would be performed).

The techniques described above can enable a radio network to achieve one or more of the following non-limiting performance gains:

1) Sustain cell edge application layer performance of a mobile node based on link layer assisted application content optimization (e.g., trans-coding of video content);

2) Enhance effective sector throughput based on link layer assisted application content optimization;

3) Optimize application content based on device type and user policies;

4) Combine IP offload gateway functionality and link layer assisted application optimization on base station or base station controller; and 5) Utilize deep packet inspection along with radio link feedback to optimize end-to-end application performance.

Figure 15:
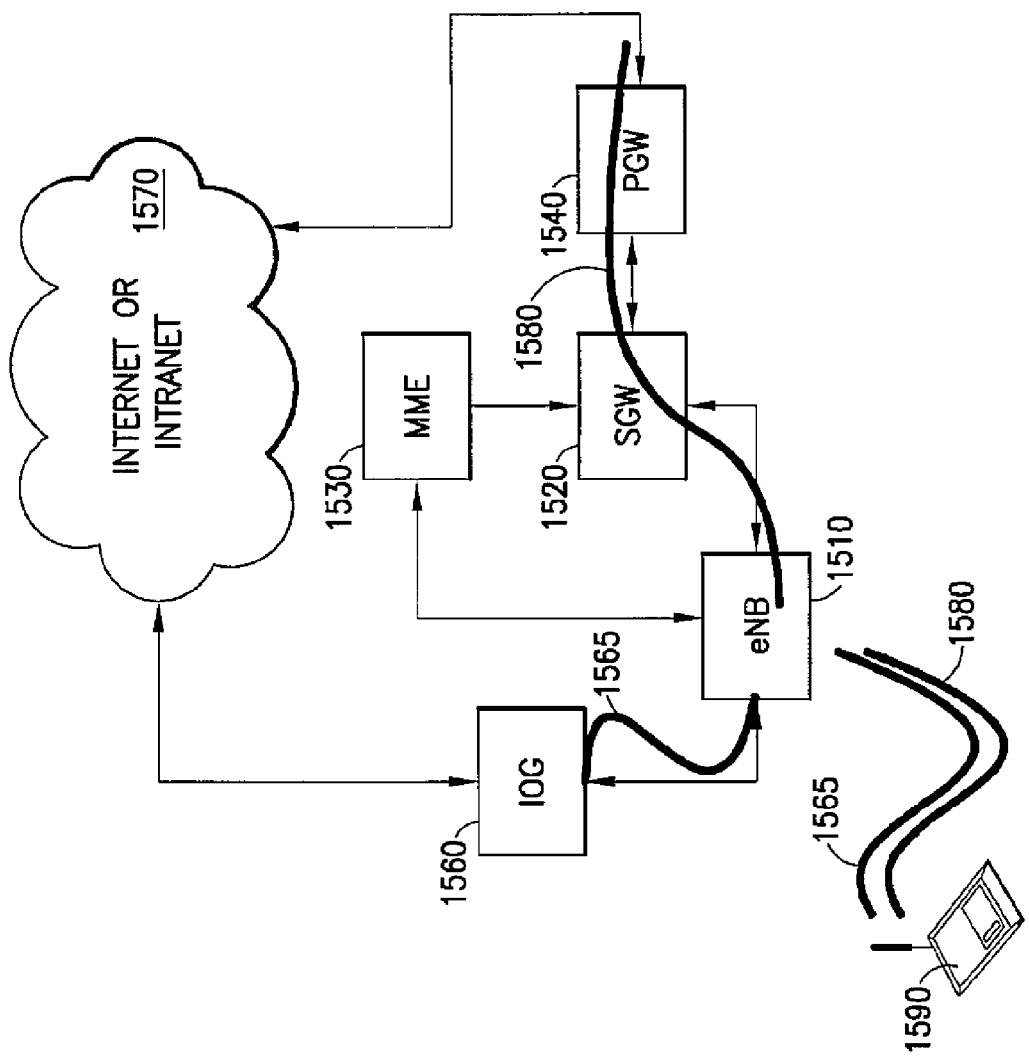
FIG. 15 illustrates a simplified block diagram of another system into which exemplary embodiments of the instant invention may be practiced.

The examples in FIGS. 1 and 10 used a UMTS-based system. However, the exemplary embodiments are not limited thereto. For instance, FIG. 15 illustrates a simplified block diagram of another system into which exemplary embodiments of the instant invention maybe practiced. The system shown in FIG. 15 is LTE-based. In this example, the mobile node 1590 communicates wirelessly with the eNB (evolved Node B) 1510. The eNB 1510 communicates with the serving gateway (SGW) 1520, the mobility management entity 1530, and the IOG 1560. The SGW 1520 communicates with the packet data network (PDN) gateway (PGW) 1540, and both the IOG 1560 and PGW 1540 communicate with a network 1570. The IOG 1560 includes, in this example, the functionality described above for IOG 160. Application flow(s) 1565 may be Local IP access (LIPA) traffic or other traffic suitable for IP offloading. The application flow(s) 1580 may be other IP traffic not suitable for IP offloading such as core network traffic. It is noted that the IOG 1560 may be connected to the SGW 1520 and/or the MME 1530.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   presenting to a user by means of a user interface a description of user options to modify a quality of experience of an existing service provided by a radio network for one or more application flows between the radio network and a mobile node used by the user, the options comprising:
   making a selection indicating a choice to decline to upgrade the existing service provided by the radio network to an upgraded service provided by the radio network enabled to support the one or more application flows with a higher quality of experience than supported by the existing service provided by the radio network; and
   making a selection indicating a choice to upgrade the existing service provided by the radio network to the upgraded service provided by the radio network enabled to support the one or more application flows with the higher quality of experience than currently supported by the existing service provided by the radio network;
   in response to the selection by the user indicating a choice to upgrade the existing service provided by the radio network to the upgraded service provided by the radio network, performing one or more actions to upgrade the existing service provided by the radio network to the mobile node to the upgraded service; wherein, making the selection indicating a choice to upgrade the service provided by the radio network comprises indicating consent to receive commercial advertising content associated with the one or more application flows; and
   in response to the indication by the user of the consent to receive the commercial advertising content, injecting the advertisement content into at least one of the one or more application flows.

2. The method of claim 1, wherein at least one of the one or more application flows comprises visual content to be viewed on a display of the mobile node and wherein the injection further comprises injecting the commercial advertising content into the visual content so as to present to the commercial advertising content as part of the visual content so as to present the commercial advertising content as part of the visual content on the display.

3. The method of claim 1, wherein at least one of the one or more application flows comprises a visual content for presentation in a first window on a display of the mobile node and wherein the injecting further comprises injecting the advertising content for presentation in a second window separate from the first window.

4. The method of claim 1, wherein the description of user options further comprise a description of a user option comprising making a selection indicating a choice to upgrade the existing service by selecting an option to pay extra for the upgraded service.

5. The method of claim 1, wherein presenting the description of user options is performed in response to a determination that the quality of experience is compromised, the determination being based on more or more of: recognition that the mobile node is not experience a quality of service of the existing service provided by the radio network sufficient to support a new application flow; and degradation of application performance for an application corresponding to the one or more application flows.

6. The method of claim 1, wherein presenting the description of user options is performed in response to recognition of a compromised quality of experience, the determination being based at least on performing a deep packet scan of a plurality of packets of the one or more application flows, determining metadata from the plurality of packets, and using the metadata to determine whether a quality of experience is compromised.

7. The method of claim 1, wherein performing one or more actions to upgrade the existing service further comprises using a more conservative modulation and coding scheme relative to a currently used modulation and coding scheme for radio communication of information corresponding to the one or more application flows and between the radio network and the mobile node.

8. The method according to claim 1, wherein performing one or more actions to upgrade the existing service further comprises sending a proactive grant in uplink to the mobile node.

9. The method according to claim 1, wherein performing one or more actions to upgrade the existing service further comprises enabling beam-forming for radio communication of information corresponding to the one or more application flows and between the radio network and the mobile node.

10. The method of claim 9, wherein performing one or more actions to upgrade the existing service further comprises determining that the current media coding rate should be reduced to the lower media coding rate based on one or more metrics representative of throughput between the radio network and the mobile node.

11. The method according to claim 10, wherein the one or more metrics further comprises one or more of one or more channel quality information reports; one or more precoding matrix index reports; one or more sounding reference signal reports; one or more reference signals received power measurement reports; or one or more reference signal receive quality measurement reports.

12. The method of claim 1, wherein: the one or more application flows form part of a media stream and wherein performing one or more actions to upgrade the existing service further comprises: extracting a portion from the media stream, the portion being coded at a current media coding rate; replacing the portion with a new portion coded at a lower media coding rate; and placing the new portion back into the media stream.

13. A method, comprising:
receiving from a radio network a request corresponding to one or more application flows between the radio network and a mobile node, wherein the one or more application flows is an existing service provided by the radio network having a quality of service; and wherein the received request comprises a description of options for presentation to a user, wherein the options comprise:
making a selection indicating declining to upgrade the existing service provided by the radio network to an upgraded services provided by the radio network enabled to support the one or more application flows with a higher quality of experience than currently supported by the existing service provided by the radio network; and
making a selection indicating accepting to upgrade the existing service provided by the radio network to the upgraded service provided by the radio network enabled to support the one or more application flows with the higher quality of experience than supported by the existing service provided by the radio network; configuring the description of options for presentation on a display of the mobile node;
detecting the selection of one of the options by the user; and
in response to the detection of the selection by the user indicating a choice to upgrade from the existing service provided by the radio network to the upgraded service provided by the radio network, sending from the mobile node to the radio network an indication that the user selected the option to upgrade the existing service to the upgraded services provided by the radio network; wherein, making the selection indicating accepting to upgrade the existing service provided by the radio network comprises indicating consent to receive commercial advertising content associated with the one or more application flows, wherein the advertisement content is injected into at least one of the one or more application flows.

14. The method of claim 13, wherein accepting the option to upgrade the existing service comprises indicating consent to receive commercial advertising content associated with the one or more application flows.

15. The method of claim 14, wherein the one or more application flows comprise visual content for presentation on the display, wherein the method further comprises displaying a version of the visual content on the display, and wherein the version comprises commercial advertising content residing in the displayed version of the content.

16. The method of claim 14, wherein the one or more application flows comprise visual content for presentation in a first window of the display and wherein the method further comprises displaying the commercial advertising content in a second window separate from the first window.

17. The method of claim 13, wherein the request comprises information indicating that accepting the option to upgrade from the existing service comprises indicating consent to pay extra for the upgraded service.

18. The method of claim 13, wherein the request comprises information indicating that accepting the option to upgrade from the existing service may be accomplished by at least one of consenting to receive commercial advertising content associated with the one or more application flows or paying extra for the upgraded service.

* * * * *